United States Patent
Snow, Jr. et al.

(10) Patent No.: US 8,801,831 B1
(45) Date of Patent: Aug. 12, 2014

(54) FUEL SAVING INERT GAS GENERATION SYSTEM

(75) Inventors: Donald Ray Snow, Jr., Fountain Valley, CA (US); David Michael Smith, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 13/324,679

(22) Filed: Dec. 13, 2011

(51) Int. Cl.
  *A62C 3/08* (2006.01)
  *B64D 37/32* (2006.01)
  *A62C 3/06* (2006.01)

(52) U.S. Cl.
  CPC ... *A62C 3/06* (2013.01); *A62C 3/08* (2013.01); *B64D 37/32* (2013.01); *B01D 2256/10* (2013.01); *B01D 2257/104* (2013.01); *B01D 2259/40003* (2013.01); *B01D 2259/4575* (2013.01)
  USPC .................................. 95/1; 95/22; 244/135 R (58) Field of Classification Search
  CPC ............ A62C 3/06; A62C 3/08; B64D 37/32; B01D 53/22; B01D 2257/104; B01D 2256/10; B01D 2259/40003; B01D 2259/4575
  USPC ................ 95/1, 14, 19, 22, 43, 47; 96/4, 420; 244/129.2, 135 R
  See application file for complete search history.

(56) References Cited

U.S. PATENT DOCUMENTS

| | | | | |
|---|---|---|---|---|
| 4,681,602 A | * | 7/1987 | Glenn et al. | 95/47 |
| 5,843,212 A | * | 12/1998 | Nanaji | 96/4 |
| 7,152,635 B2 | | 12/2006 | Moravec et al. | |
| 7,172,156 B1 | * | 2/2007 | Jones | 244/135 R |
| 7,204,868 B2 | | 4/2007 | Snow, Jr. | |
| 7,306,644 B2 | * | 12/2007 | Leigh et al. | 95/14 |
| 7,608,131 B2 | * | 10/2009 | Jensen | 95/11 |
| 7,625,434 B2 | * | 12/2009 | Tom et al. | 96/4 |
| 7,828,874 B2 | * | 11/2010 | Surawski et al. | 95/14 |
| 8,147,579 B2 | * | 4/2012 | DeFrancesco et al. | 55/418 |
| 2009/0071340 A1 | * | 3/2009 | Surawski | 96/4 |

* cited by examiner

*Primary Examiner* — Frank Lawrence
(74) *Attorney, Agent, or Firm* — Yee & Associates, P.C.

(57) ABSTRACT

A method and apparatus for controlling inert gas generation. An apparatus comprises an air separation module and an air flow control system. The air separation module is configured to separate an inert gas from air input into the air separation module. The air flow control system is configured to control the flow of the air into the air separation module.

18 Claims, 7 Drawing Sheets

FUEL SAVING INERT GAS GENERATION SYSTEM

GOVERNMENT LICENSE RIGHTS

This application was made with United States Government support under contract number FA8615-08-3-2080 awarded by the United States Air Force. The United States Government has certain rights in this application.

BACKGROUND INFORMATION

1. Field

The present disclosure relates generally to aircraft and, in particular, to inert gas generation systems for aircraft. Still more particularly, the present disclosure relates to a method and apparatus for controlling operation in an inert gas generation system for aircraft.

2. Background

Many aircraft have inert gas generation systems. An inert gas generation system may be used to render a fuel tank in an aircraft substantially inert. Fuel tanks in an aircraft may have a space above the fuel in which fuel vapors may be present. This space in the fuel tank is referred to as an ullage.

The inert gas generation system is employed to reduce a possibility of combustion within this space in a fuel tank. The inert gas generation system may reduce the oxygen content in these spaces below a threshold needed for combustion. Without sufficient oxygen, combustibility of fuel vapors in these locations is unlikely.

The inert gas generation system introduces an inert gas into the ullage in the fuel tank. This inert gas may be, for example, nitrogen, nitrogen enriched air, carbon dioxide, and other types of inert gases.

An inert gas generation system may employ air separation modules to generate the inert gas. For example, an air separation module may be configured to generate nitrogen enriched air from air that is sent into the air separation module. This nitrogen enriched air is then sent into the fuel tank.

The operation of the inert gas generation system may increase fuel costs more than desired to operate the aircraft. Further, continual use of the inert gas generation system during operation of the aircraft may increase maintenance needed for the inert gas generation system.

Therefore, it would be desirable to have a method and apparatus that takes into account at least some of the issues discussed above as well as possibly other issues.

SUMMARY

In one illustrative embodiment, an apparatus comprises an air separation module and an air flow control system. The air separation module is configured to separate an inert gas from air input into the air separation module. The air flow control system is configured to control a flow of the air into the air separation module.

In another illustrative embodiment, a method for controlling a flow of air into an air separation module is present. A desired amount of inert gas generation for a fuel tank system is identified. The flow of the air into an air separation module is controlled based on the desired amount of inert gas generation for the fuel tank system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use and further objectives thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the different illustrative embodiments recognize and take into account that the amount of inert gas needed to maintain a desired level of inert gas in the fuel tanks during flight of an aircraft may change during the different phases of flight. As a result, the different illustrative embodiments recognize and take into account that it may be desirable to change the amount of inert gas generation during different phases of flight to provide the desired level of inert gas in the fuel tanks. During some phases of flight, the amount of inert gas generation needed to provide a desired level of inertness within a gas tank may be lower during other phases of flight.

For example, the different illustrative embodiments recognize and take into account that most air separation modules used in inert gas generation systems are sized for generating inert gas to higher levels of inert gas generation that may occur during a phase of flight, such as descent of an aircraft. During descent of an aircraft, the pressure outside of the aircraft increases. This increase in pressure requires more capacity from the air separation modules to prevent the ingress of non-inert outside air into the ullages in the fuel tank.

The different illustrative embodiments recognize and take into account that during other phases of flight, the amount of inert gas production needed to provide a level of inertness in a fuel tank may be lower. For example, the amount of inert gas needed from an inert gas generation system is lower during constant altitude cruising as compared to descent of the aircraft.

The different illustrative embodiments recognize and take into account that inert gas generation systems may be configured to reduce the flow of nitrogen enriched air flow to the fuel tanks during these lower demand conditions. The nitrogen enriched air flow is typically reduced for these low flow modes by fully or partially closing one or more valves that restrict the flow area in the distribution system between the air separation module and the fuel tanks that reduces air consumption by the inert gas generation system.

The different illustrative embodiments recognize and take into account that controlling the flow of nitrogen enriched air in these systems result in higher pressure in the air separation module. This higher pressure results in lower oxygen levels in the nitrogen enriched air and may allow the use of smaller air separation modules. The different illustrative embodiments recognize and take into account, however, this type of control may increase maintenance on air separation modules.

The different illustrative embodiments recognize and take into account that many currently used inert gas generation systems may automatically reduce the inlet temperature during these low flow modes. This reduces the permeation rate but does not result in a large enough or desired reduction in air consumption, because the temperature cannot be reduced much without requiring a longer than desired warm-up period when the demand for inert gas increases.

The different illustrative embodiments recognize and take into account that currently used inert gas generation systems may shut off the entire system during flight to reduce fuel consumption and extend the life of components in the inert gas generation system. The different illustrative embodiments also recognize and take into account that this type of operation may be undesirable because of the absence in the generation of an inert gas when the system is shut off, the time needed to restart the inert gas generation system, or a combination of the two.

Thus, one or more illustrative embodiments provide a method and apparatus for generating inert gases. In one illustrative embodiment, an air separation module is configured to separate an inert gas from an air input into the air separation module. The apparatus also includes an air flow control system. The air flow control system is configured to reduce a flow of air into the air separation module. This reduction of inlet air flow into the air separation module is accompanied by a reduction in the nitrogen enriched air flow from the air separation module. Reducing the flow of air into the air separation module may be accomplished by controlling the flow rate of the air that flows into the air separation module. The flow of air into the inlet of the air separation module may be controlled by restricting the entry of air into the inlet of the air separation module. By controlling the flow rate, the pressure at the inlet also may be controlled.

In the different illustrative embodiments, the controlling of the flow of air is performed at a location that is upstream from the air separation module. For example, controlling of the flow of air may be performed by controlling the pressure that is present at the input to the air separation module. With the reduction in air pressure at the input to the air separation module, the air separation module may have increased life and lower maintenance.

Further, air used by an air separation module may be obtained from an air source, such as the engine in an aircraft. When air is drawn from the engine for use in the air separation module, the fuel efficiency of the engine decreases as compared to when air is not needed from the engine. The illustrative embodiments recognize and take into account that by controlling the flow of air into the air separation module, a reduction in the amount of air needed from an engine in an aircraft may be reduced. In this manner, fuel savings may occur.

Figure 1:
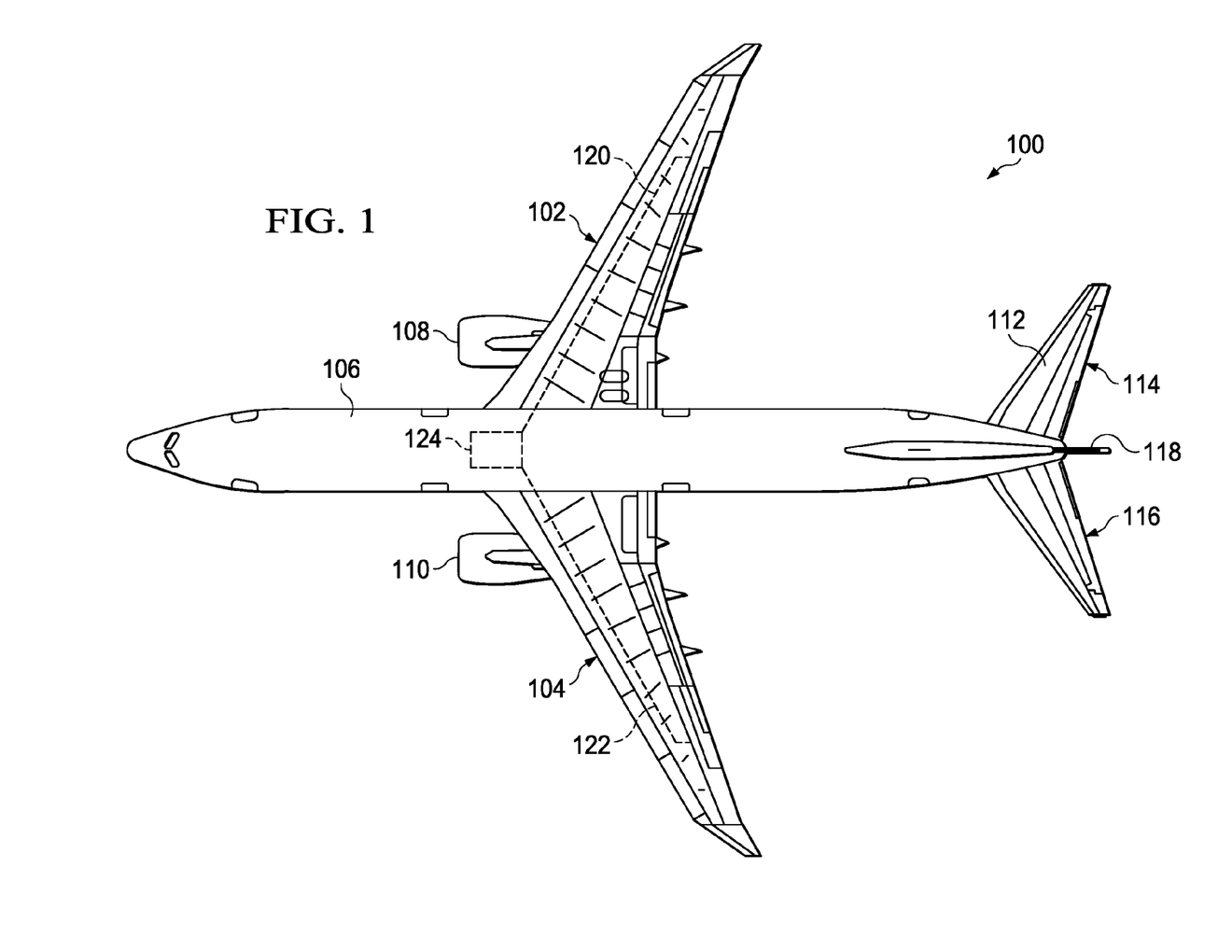
FIG. 1 is an illustration of an aircraft in accordance with an illustrative embodiment.

With reference now to the figures and, in particular, with reference to FIG. 1, an illustration of an aircraft is depicted in accordance with an illustrative embodiment. Aircraft 100 is an example of a platform in which an illustrative embodiment may be implemented.

In this illustrative example, aircraft 100 has wing 102 and wing 104 attached to body 106. Additionally, aircraft 100 also has engine 108 attached to wing 102 and engine 110 attached to wing 104. Tail 112 of aircraft 100 has horizontal stabilizer 114, horizontal stabilizer 116, and vertical stabilizer 118. In this illustrative example, wing 102 has fuel tank 120, and wing 104 has fuel tank 122.

As depicted in these illustrative examples, inert gas generation system 124 is located in body 106 and is connected to fuel tank 120 in wing 102 and fuel tank 122 in wing 104. Inert gas generation system 124 is configured to generate and send inert gas into fuel tank 120 and fuel tank 122.

In these illustrative examples, inert gas generation system 124 may receive air from a source, such as from engine 108, engine 110, or both, for use in generating inert gas. Air may be supplied to inert gas generation systems by other sources other than the engines, such as compressors that are separate from the engines. The electrical or hydraulic power that is used to drive these compressors is supplied by the engines or an auxiliary power unit in the aircraft. Therefore, a reduction in air consumed by inert gas generation system 124 will reduce the power required to drive the separate compressors and result in fuel savings, lower maintenance, or both for these systems as well.

An illustrative embodiment may be implemented in inert gas generation system 124. When inert gas generation system 124 is constructed in accordance with an illustrative embodiment, the amount of fuel use by aircraft 100 may be reduced. Further, inert gas generation system 124 also may require less maintenance when implemented in accordance with an illustrative embodiment.

Figure 2:
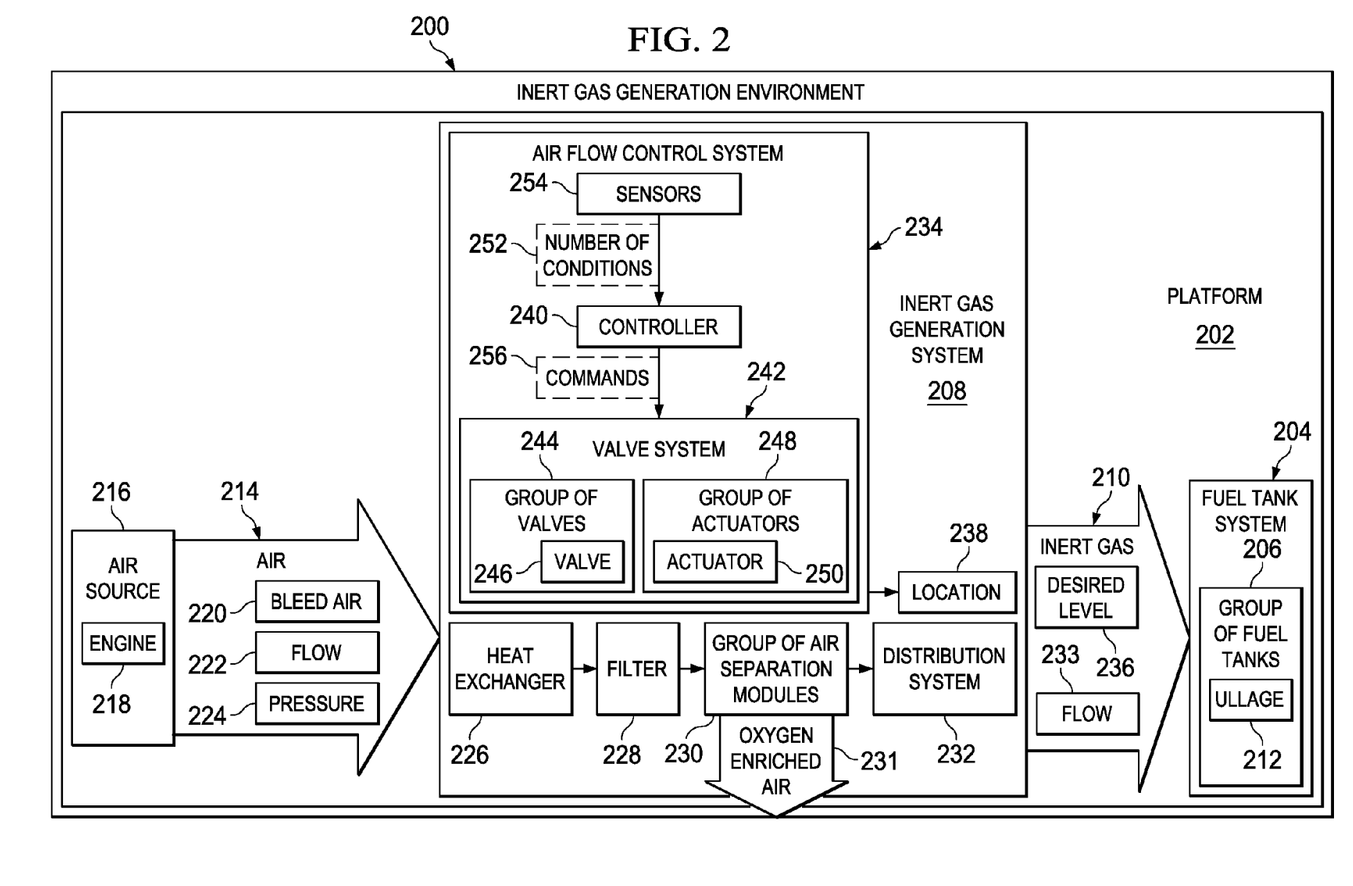
FIG. 2 is an illustration of a block diagram of an inert gas generation environment in accordance with an illustrative embodiment.

The illustrative embodiments may be used to reduce flow 222 of air 214 into group of air separation modules 230 during times when a lower demand for inert gas 210, such as nitrogen enriched air, is present. This reduction can be performed during these times of lower demand. In other words, the reduction of flow 222 of air 214 at location 238 upstream of group of air separation modules 230 may be performed when needed. Flow 222 of air 214 may be reduced by inert gas generation system 208, but not halted as compared to other systems that generate inert gas.

Turning now to FIG. 2, an illustration of a block diagram of an inert gas generation environment is depicted in accordance with an illustrative embodiment. In this illustrative example, inert gas generation environment 200 comprises platform 202 and fuel tank system 204. Aircraft 100 in FIG. 1 is an example of one implementation for platform 202 in FIG. 2.

In this illustrative example, fuel tank system 204 comprises group of fuel tanks 206. A "group", as used herein with reference to items, means one or more items. For example, "group of fuel tanks 206" is one or more fuel tanks.

In this illustrative example, inert gas generation system 208 is configured to generate inert gas 210 and send inert gas 210 into fuel tank system 204. Inert gas 210 reduces combustibility in ullage 212 in fuel tank system 204. In other words, ullage 212 may be present in one or more of group of fuel tanks 206, and inert gas 210 reduces combustibility of group of fuel tanks 206.

Inert gas 210 may be any gas that reduces combustibility of any fuel vapors within group of fuel tanks 206. Inert gas 210 may take various forms. For example, inert gas 210 may be nitrogen, nitrogen enriched air, carbon dioxide, and other types of inert gases.

In these illustrative examples, inert gas 210 is generated from air 214 received from air source 216. Air 214 is pressurized and heated in this illustrative example. In these illustrative examples, air source 216 takes the form of engine 218. Air 214 from engine 218 is bleed air 220 in these illustrative examples.

In these illustrative examples, inert gas generation system 208 may be controlled to reduce the generation of inert gas 210 when less inert gas 210 is needed in fuel tank system 204. The generation of inert gas 210 may also be referred to as inert gas generation.

In these illustrative examples, inert gas generation system 208 controls flow 222 of bleed air 220 used to produce inert gas 210 that enters into fuel tank system 204. In these illustrative examples, inert gas generation system 208 may control flow 222 of bleed air 220 by reducing flow 222 of bleed air 220. In particular, inert gas generation system 208 may control pressure 224 in flow 222 of bleed air 220 used to produce inert gas 210 that enters into fuel tank system 204.

In these illustrative examples, inert gas generation system 208 comprises a number of different components. For example, inert gas generation system 208 includes heat exchanger 226, filter 228, group of air separation modules 230, distribution system 232, and air flow control system 234.

Heat exchanger 226 receives air 214 in the form of bleed air 220 from engine 218 in these illustrative examples. Heat exchanger 226 is configured to reduce a temperature of air 214 to a desired temperature for use in group of air separation modules 230.

Air 214 is sent from heat exchanger 226 to filter 228. Filter 228 is configured to remove undesired contamination that may be present within air 214.

Thereafter, air 214 is sent into group of air separation modules 230. Group of air separation modules 230 generates inert gas 210 from air 214 and exhausts oxygen enriched air 231 overboard outside of platform 202 in these illustrative examples. Inert gas 210 is distributed to fuel tank system 204 by distribution system 232. Distribution system 232 is connected to group of air separation modules 230. Distribution system 232 may comprise pipes, valves, and other components configured to send inert gas 210 into group of fuel tanks 206 in fuel tank system 204. Flow 233 of inert gas 210 is supplied from group of air separation modules 230 to fuel tank system 204 through distribution system 232 at different rates, depending on different operating conditions.

The generation of inert gas 210 by group of air separation modules 230 may be controlled in a manner that reduces fuel use in platform 202 and maintenance for inert gas generation system 208.

For example, the fuel use may be fuel used by engine 218 when engine 218 is air source 216 for air 214 used by inert gas generation system 208. When air 214 is obtained from engine 218, engine 218 uses more fuel.

Further, with pressure 224 applied to group of air separation modules 230, flow 222 of air 214 into group of air separation modules 230 may result in group of air separation modules 230 requiring maintenance after some period of time. Pressure 224 may increase wear on components within group of air separation modules 230.

In these illustrative examples, air flow control system 234 is configured to control flow 222 of air 214 through inert gas generation system 208 in a manner that reduces the maintenance needed for group of air separation modules 230. Flow 222 of air 214 may be controlled by reducing or increasing flow 222 of air 214. For example, air flow control system 234 reduces flow 222 of air 214 into group of air separation modules 230 when a lower level of flow 222 of air 214 is needed to generate inert gas 210. In particular, air flow control system 234 is configured to control flow 222 of air 214 at location 238. In these illustrative examples, location 238 in inert gas generation system 208 is upstream from group of fuel tanks 206 with respect to flow 222 of air 214.

In these illustrative examples, air flow control system 234 may comprise controller 240 and valve system 242. Controller 240 may be hardware, software, or a combination of the two.

The hardware for controller 240 may take the form of a circuit system, an integrated circuit, a computer system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components, excluding a human being. When controller 240 includes software, the operations performed by controller 240 may be implemented in the program code configured to be run on a processor unit in a computer system.

As depicted, valve system 242 comprises group of valves 244. Each valve in group of valves 244 may control flow 222 of air 214 into one or more air separation modules in group of air separation modules 230. In some illustrative examples, group of valves 244 may comprise a single valve that is configured to control all of group of air separation modules 230. Valve 246 in group of valves 244 is any device that controls flow 222 of air 214 in these illustrative examples. For example, valve 246 may allow flow 222 of air 214, shut off flow 222 of air 214, control a pressure for flow 222 of air 214, control a rate of flow 222 of air 214, and other suitable types of controls for flow 222 of air 214.

Flow 222 of air 214 may be controlled within the range of existing valves.

Valve system 242 also may include group of actuators 248. Group of actuators 248 is associated with group of valves 244.

When one component is "associated" with another component, the association is a physical association in these depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

One or more actuators in group of actuators 248 are examples of components that may be controlled by controller 240. These actuators in group of actuators 248 may operate to control the position of group of valves 244.

In these illustrative examples, actuator 250 in group of actuators 248 is any device that may move valve 246 to control a position of valve 246. Actuator 250 may take a number of different forms. For example, actuator 250 may be a hydraulic actuator, an electromechanical actuator, a solenoid, a motor, or some other suitable type of actuator.

In these illustrative examples, controller 240 may identify the amount of inert gas 210 to be generated by inert gas generation system 208 in a number of different ways. For example, controller 240 may take into account number of conditions 252 for platform 202.

When platform 202 is an aircraft, number of conditions 252 may include, for example, at least one of a climb rate, a descent rate, a fuel quantity in the fuel tank, an engine thrust setting, whether anti-icing systems are on or off, a pressure in the fuel tank, a pressure outside of the aircraft, a temperature of the group of air separation modules, and other suitable conditions. Number of conditions 252 may be identified from data received from sensors 254. Number of conditions 252 may also include a user input to override an automatic flow mode selection.

Based on number of conditions 252, controller 240 may send commands 256 to group of actuators 248 to control the position of one or more values in group of valves 244. As a result, flow 222 of air 214 and pressure 224 in flow 222 of air 214 entering group of air separation modules 230 may be controlled by controller 240.

For example, flow 224 of air 214 entering one or more of group of air separation modules may be controlled to have different states for different levels of flow 224 of air 214. For example flow 224 of air 214 may have a first level that is higher than a second level of flow 224 of air 214. The different levels may be obtained by controlling position of valve 246. The positions for the first level and the second level are position between an open position and a closed position in this example.

In these illustrative examples, when a valve is described as being open or in an open position, the valve is considered to be fully open or in an open state. In other words, the valve is opened as much as possible to allow for flow of a fluid without restriction by the valve. When a valve is described as being closed or in a closed position, the valve is fully closed or in a closed state. In other words, the valve is closed as much as possible to prevent or substantially prevent the flow of a fluid through the valve.

Valve 246 is more open for the first level than for the second level in this example. Many different positions may be selected between and open position and a close position to obtain flow 222 of air 214 at a desired level. This control of flow 222 of air 214 may be used to control pressure 224 of air 214 at a desired level. In this manner, a greater granularity in the control of flow 222 of air 214 is provided.

When less inert gas 210 is needed in fuel tank system 204, controller 240 reduces flow 222 of air 214 and flow 233 of inert gas 210 to reduce inert gas generation for fuel tank system 204. The reduction in flow 222 of air 214 into group of air separation modules 230 reduces pressure 224 of air 214 entering group of air separation modules 230. Further, when more inert gas 210 is needed, controller 240 may increase flow 222 of air 214 and flow 233 of inert gas 210 to increase inert gas generation for fuel tank system 204. In this manner, a desired amount of inert gas generation of inert gas 210 may occur for fuel tank system 204.

For example, when platform 202 takes the form of an aircraft that is cruising during flight, less inert gas 210 is needed. As a result, when controller 240 detects a cruising phase in number of conditions 252, controller 240 may reduce flow 222 of air 214 into group of air separation modules 230 at the same time controller 240 reduces flow 233 of inert gas 210. When platform 202 descends, controller 240 detects a descent phase in number of conditions 252. In detecting this phase of flight, controller 240 increases flow 222 of air 214 and flow 233 of inert gas 210.

As another example, controller 240 may detect an increase in outside pressure from sensors 254 in number of conditions 252 when platform 202 descends. The increase in outside pressure in number of conditions 252 may be used by controller 240 to increase flow 222 of air 214 and flow 233 of inert gas 210. In still other illustrative examples, some combination of these and other conditions may be used to control flow 222 of air 214 into group of air separation modules 230 to control the generation of inert gas 210 for fuel tank system 204.

Additionally, controller 240 also may detect a temperature of group of air separation modules 230 in number of conditions 252. The temperature of group of air separation modules 230 may be used to increase flow 222 of air 214 to maintain a desired operating temperature for group of air separation modules 230. For example, if platform 202 is in a cruising phase of flight, flow 222 of air 214 is reduced. If the temperature of group of air separation modules 230 is reduced below some desired level, flow 222 of air 214 may be increased.

As a result, controller 240 in inert gas generation system 208 may provide desired level 236 of inert gas 210 in a manner that reduces fuel use and maintenance for inert gas generation system 208. Desired level 236 may be measured in a number of different ways. For example, desired level 236 may be a flow rate, a pressure, an amount, or some other measurement of inert gas 210.

In particular, by controlling flow 222 of air 214 in location 238 that is upstream from group of air separation modules 230, maintenance for group of air separation modules 230 is reduced. This reduced maintenance may occur from reducing pressure 224 from flow 222 of air 214 into group of air separation modules 230 when lower levels of inert gas 210 are needed in fuel tank system 204. The reduction of pressure 224 at different times may reduce the wear on components within group of air separation modules 230, such as, for example, mechanical creep of epoxy that may be used to hold components, such as hollow fibers in a separation system within group of air separation modules 230.

In the illustrative examples, the selection of location 238 as being upstream of group of air separation modules 230 may reduce pressure 224, resulting in a higher concentration of oxygen in inert gas 210 when inert gas 210 is in the form of nitrogen enriched air. The level of oxygen may be controlled to have a level that is low enough to provide a desired level of inertness for fuel tank system 204 even though the level of oxygen may not be as low as when the control system is located downstream of group of air separation modules 230.

The illustration of inert gas generation environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although platform 202 has been described with respect to an aircraft, platform 202 may take other forms in which an illustrative embodiment may be implemented. For example, without limitation, other illustrative embodiments may be applied to a mobile platform, a stationary platform, a land-based structure, an aquatic-based structure, a space-based structure, and/or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

Figure 3:
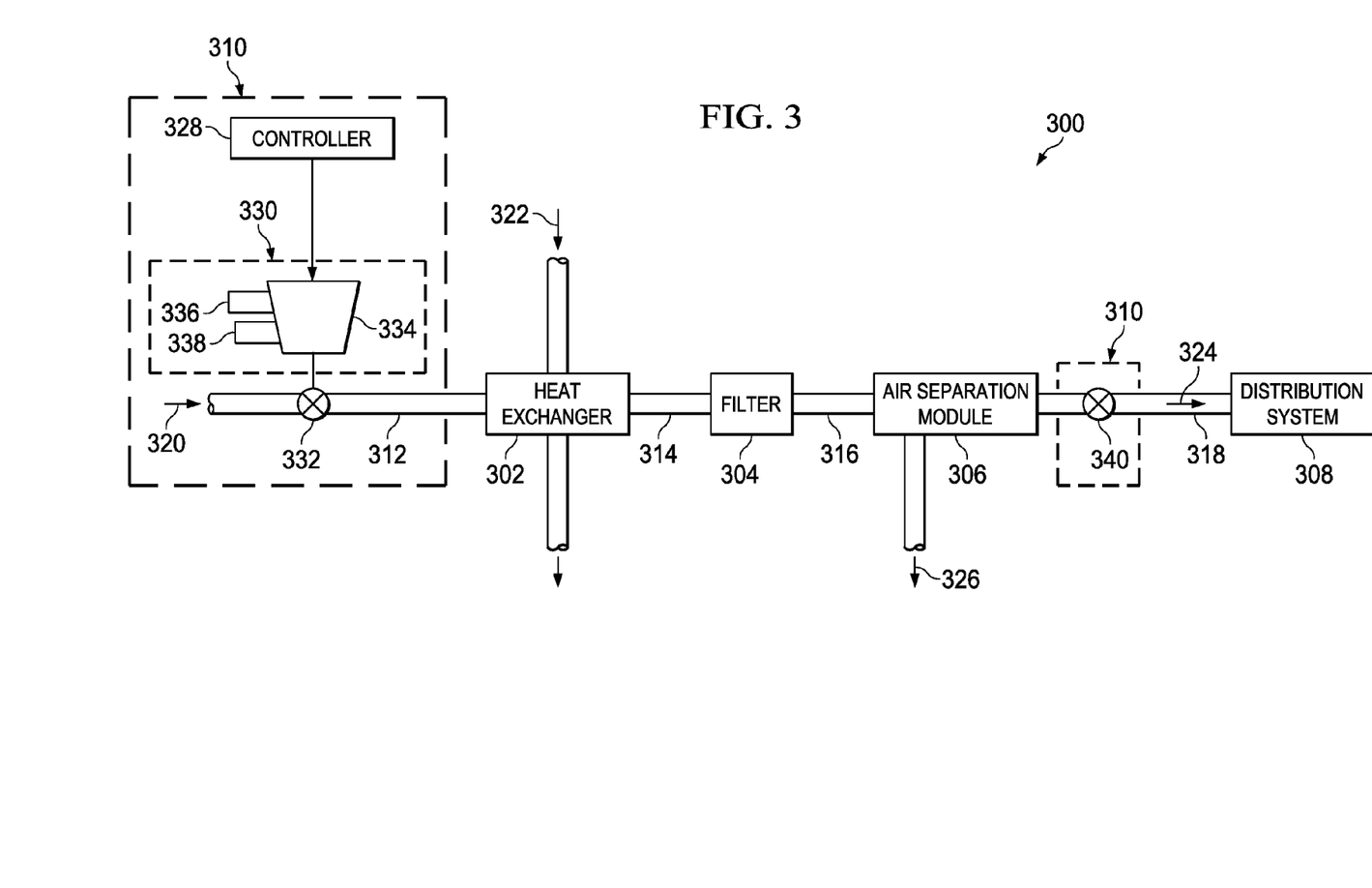
FIG. 3 is an illustration of an inert gas generation system in accordance with an illustrative embodiment.

Turning now to FIG. 3, an illustration of an inert gas generation system is depicted in accordance with an illustrative embodiment. In this depicted example, inert gas generation system 300 is an example of one implementation of inert gas generation system 208 in FIG. 2.

In this depicted example, inert gas generation system 300 comprises heat exchanger 302, filter 304, air separation module 306, and distribution system 308. Additionally, inert gas generation system 300 also includes air flow control system 310. As depicted, pipes are used to connect different components to each other and provide a conduit for the flow of fluids, such as gases.

Heat exchanger 302 is connected to pipe 312. Pipe 314 connects heat exchanger 302 to filter 304. Pipe 316 connects filter 304 to air separation module 306. Pipe 318 connects air separation module 306 to distribution system 308. More specifically, pipe 318 connects an output of air separation module 306 that outputs nitrogen enriched air 324 to distribution system 308.

Air 320 flows through pipe 312 to heat exchanger 302. Air 320 is pressurized and heated in these examples. Air 320 is bleed air from a source, such as an aircraft engine.

Heat exchanger 302 receives cooling air 322 to reduce temperature of air 320 to a desired temperature. Air 320 then flows through filter 304, which is configured to reduce undesired contaminants from air 320. Thereafter, air 320 passes through air separation module 306. Air separation module 306 generates inert gas in the form of nitrogen enriched air 324, which is sent to distribution system 308. Distribution system 308 distributes nitrogen enriched air 324 to the fuel tanks in an aircraft. Distribution system 308 includes features that selectively reduce the supply of nitrogen enriched air 324 when commanded by controller 328.

In generating nitrogen enriched air 324, air separation module 306 also generates oxygen enriched air 326. Oxygen enriched air 326 is not used but is an exhaust gas in these illustrative examples.

In these illustrative examples, air flow control system 310 comprises controller 328 and valve system 330. Valve system 330 comprises valve 332 having actuator system 334.

As depicted, actuator system 334 includes actuators in the form of solenoid 336 and solenoid 338. Solenoid 336 may be controlled to place valve 332 into an open position or a closed position. In these illustrative examples, solenoid 336 is energized to open valve 332 and is de-energized to close valve 332.

In these illustrative examples, valve 332 may be opened to one or more intermediate positions between an open position and a closed position. This control of valve 332 may provide a finer granularity in the control the flow of air through valve 332.

In this illustrative example, valve 332 functions as a pressure regulator. Solenoid 338 is configured to enable or disable the pressure regulator function for valve 332 to selectively control the flow of air 320. In particular, when solenoid 338 is energized, valve 332 provides a pressure regulation function. When solenoid 338 is de-energized, valve 332 is either open or closed, depending on the state of solenoid 336.

When valve 332 provides a pressure regulation function, the flow of air 320 is reduced to a selected pressure level. The energization and de-energization of solenoid 336 and solenoid 338 are controlled by controller 328 in these illustrative examples. In these illustrative examples, the selected pressure level may be one that reduces fuel use by the engine.

The selected pressure level may also be selected to maintain a desired temperature in air separation module 306. In controlling the flow of air 320 to have the selected pressure, valve 332 is controlled to have a position that is between an open and closed position in these illustrative examples. This desired temperature is one that provides a desired level of nitrogen enriched air 324 generated by air separation module 306.

Different pressure levels may be selected based on the mechanism used in air separation module 306 to generate nitrogen enriched air 324 or other types of inert gases. As depicted in this particular example, controller 328 does not control the selected pressure level. In other words, the mechanism for controlling the selected pressure level is built into valve 332, and controller 328 determines whether the regulation function in valve 332 is turned on or turned off. In this illustrative example, valve 332 may be implemented using any type of pressure regulator valve that is currently available.

In these illustrative examples, the location of valve 332 is upstream of air separation module 306. By controlling the flow and/or pressure of air 320 from an upstream location, maintenance on air separation module 306 may be reduced.

Inert gas generation system 300 also may include valve 340. Valve 340 is associated with pipe 318. Valve 340 is controlled by controller 328 in this illustrative example and may be considered part of air flow control system 310. Valve 340 may be moved between an open position, a closed position, and positions in between to control the flow of nitrogen enriched air 324 to distribution system 308.

This valve may be used to increase the amount of nitrogen relative to oxygen in nitrogen enriched air 324. In other words, the oxygen level in nitrogen enriched air 324 may be reduced using valve 340. In many cases, the level of oxygen is low enough in nitrogen enriched air 324 without needing to restrict the flow of nitrogen enriched air 324 at the output or downstream side of air separation module 306.

Controlling the flow or pressure of nitrogen enriched air 324 downstream of air separation module 306 may provide a desired level of nitrogen enriched air 324. This location, however, does not reduce the flow of oxygen enriched air 326. This location also does not reduce maintenance that may be needed for air separation module 306 as compared to the upstream location depicted in accordance with an illustrative embodiment. The downstream control using valve 340 may be used in conjunction with controlling valve 332 to obtain a desired level of nitrogen and decrease fuel use and maintenance for air separation module 306.

Figure 4:
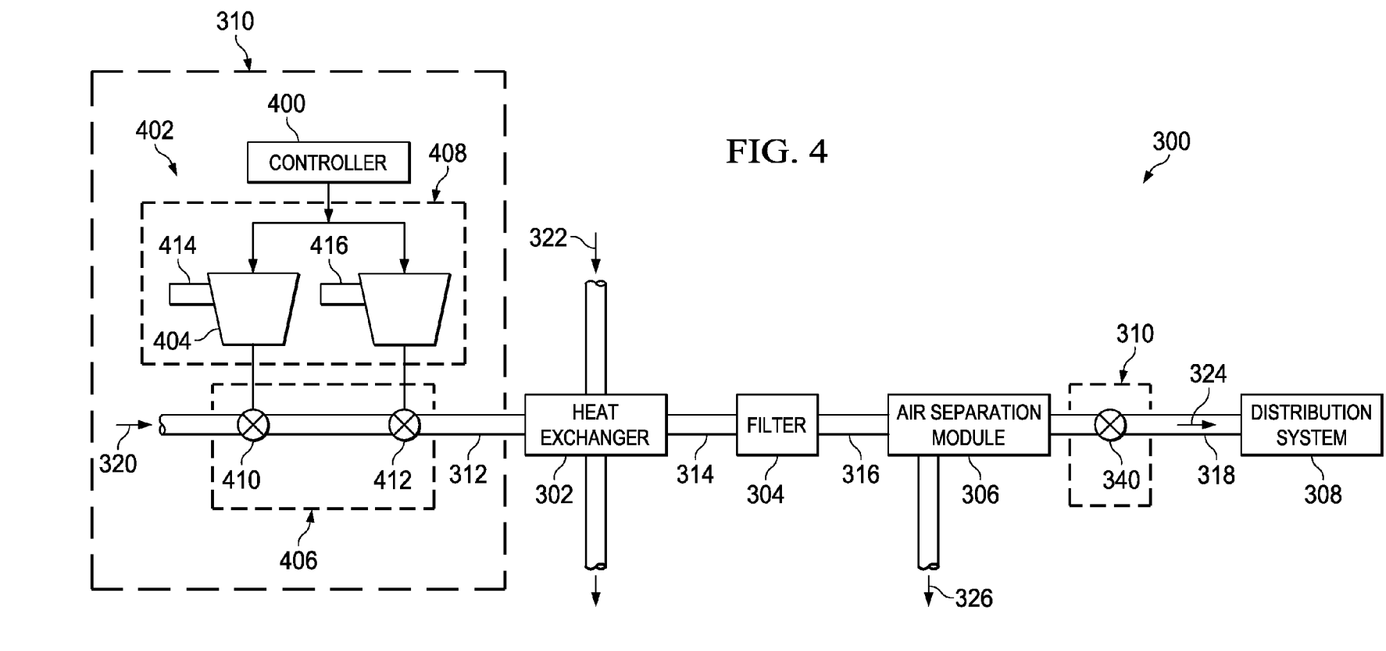
FIG. 4 is an illustration of an inert gas generation system in accordance with an illustrative embodiment.

Turning now to FIG. 4, an illustration of an inert gas generation system is depicted in accordance with an illustrative embodiment. In this illustrative example, air flow control system 310 comprises controller 400, valve system 402, and actuator system 404.

As depicted, valve system 402 comprises group of valves 406 and group of actuators 408. Group of valves 406 includes valve 410 and valve 412. These valves are associated with pipe 312. Valve 410 functions as a shut off for air 320, and valve 412 functions as a pressure regulator.

Group of actuators 408 includes solenoid 414 and solenoid 416. Solenoid 414 controls valve 410, while solenoid 416 controls valve 412. When solenoid 414 is energized, valve 410 is open. When solenoid 414 becomes de-energized, valve 410 closes.

Energizing solenoid 416 enables valve 412 to provide a pressure regulating function. De-energizing solenoid 416 places valve 412 in an open position without the pressure regulating function being active for valve 412. In this illustrative example, solenoid 414 and solenoid 416 are controlled by controller 400. In this illustrative example, both valve 410 and valve 412 are located upstream of air separation module 306.

Figure 5:
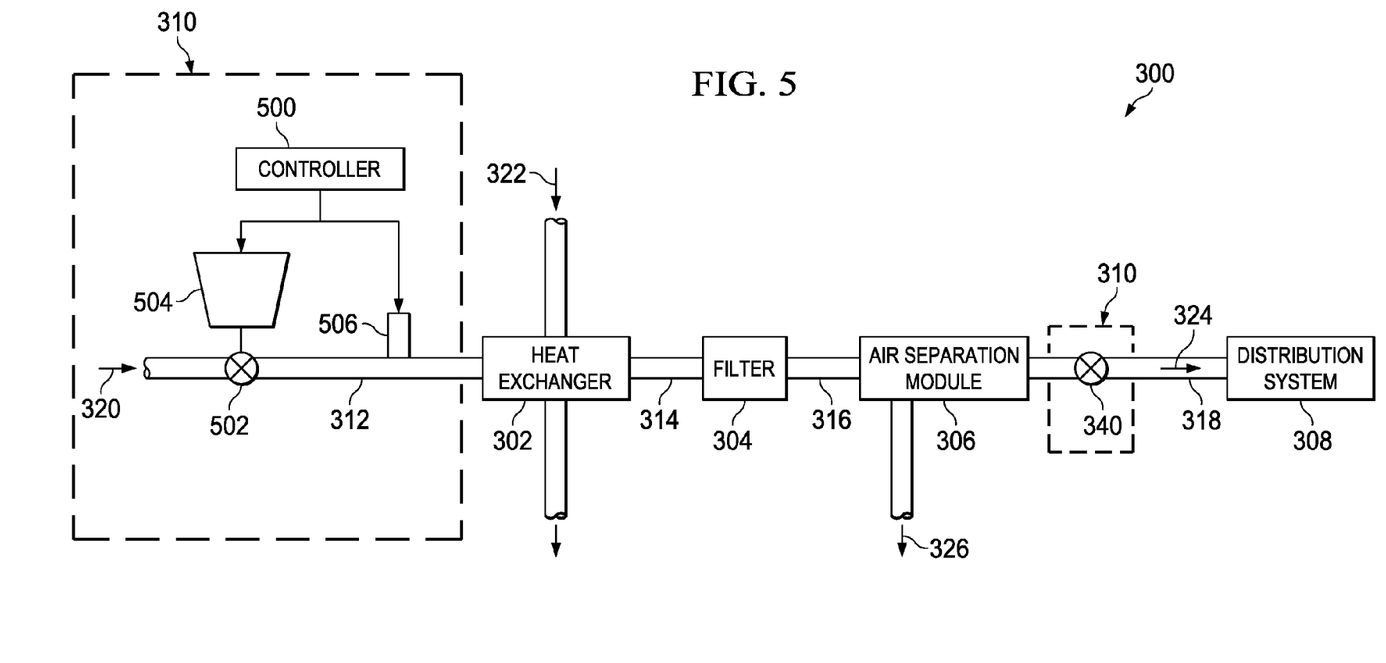
FIG. 5 is an illustration of an inert gas generation system in accordance with an illustrative embodiment.

Turning now to FIG. 5, an illustration of an inert gas generation system is depicted in accordance with an illustrative embodiment. In this illustrative example, air flow control system 310 comprises controller 500, valve 502, motor 504, and pressure sensor 506.

In this illustrative example, controller 500 controls valve 502 to open or close valve 502. Further, controller 500 also may control valve 502 to position value 502 in some intermediate position between opened and closed.

Controller 500 controls valve 502 using motor 504 and pressure sensor 506. Motor 504 may change the position of valve 502 from an open position to a closed position and between any number of intermediate positions between the open position and the closed position. In these illustrative examples, pressure sensor 506 provides data about the pressure of air 320 in pipe 312.

Based on the pressure of air 320 detected by pressure sensor 506, controller 500 controls motor 504 to change the position of valve 502 until a desired pressure of air 320 is detected by pressure sensor 506.

The illustration of inert gas generation system 300 in FIGS. 3-5 are only illustrative examples of how an air flow control system may be implemented. This illustration is not meant to limit the manner in which an air flow control system may be implemented for other inert gas generation systems. For example, whether a valve is in an open position or a closed position, or whether a pressure regulating function is turned on or off based on the energization and de-energization of solenoids, may be different from those illustrated in the figures. Further, the air flow control system may restrict the flow of air into the inlet of the air separation module when commanded to reduce pressure instead of controlling pressure to a set point.

Also, other types of actuators may be used in addition to and/or in place of a solenoid and a motor. Further, the placement of the valves controlling the flow of air 320 to air separation module 306 may be in other locations other than the ones depicted in FIGS. 3-5. For example, the valves may be located between heat exchanger 302 and filter 304, between filter 304 and air separation module 306, or in some other location upstream of air separation module 306.

Furthermore, the different components shown in FIG. 1 and FIGS. 3-5 may be combined with components in FIG. 2, used with components in FIG. 2, or a combination of the two. Additionally, some of the components in FIG. 1 and FIGS. 3-5 may be illustrative examples of how components shown in block form in FIG. 2 can be implemented as physical structures.

Figure 6:
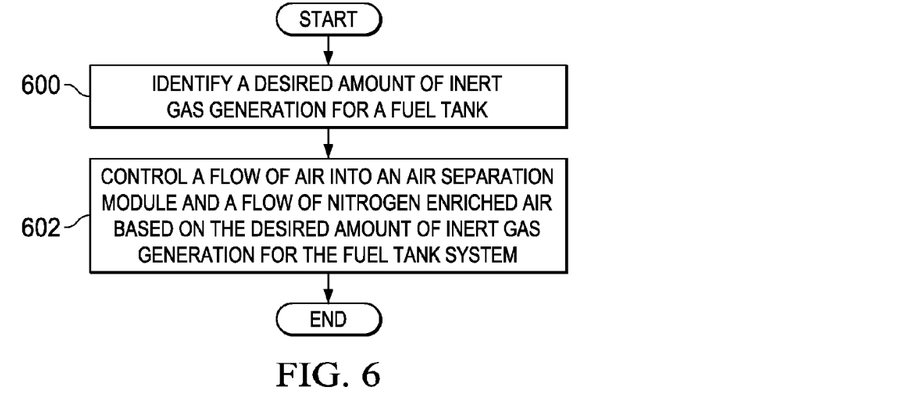
FIG. 6 is an illustration of a flowchart of a process for controlling the flow of air into an air separation module in accordance with an illustrative embodiment.

With reference now to FIG. 6, an illustration of a flowchart of a process for controlling the flow of air into an air separation module is depicted in accordance with an illustrative embodiment. The process illustrated in FIG. 6 may be implemented in inert gas generation environment 200 in FIG. 2. In particular, the process illustrated in FIG. 6 may be implemented in inert gas generation system 208 in FIG. 2.

The process begins by identifying a desired amount of inert gas generation for a fuel tank (operation 600). Thereafter, the process controls a flow of air into an air separation module and a flow of nitrogen enriched air based on the desired amount of inert gas generation for the fuel tank system (operation 602), with the process terminating thereafter.

Figure 7:
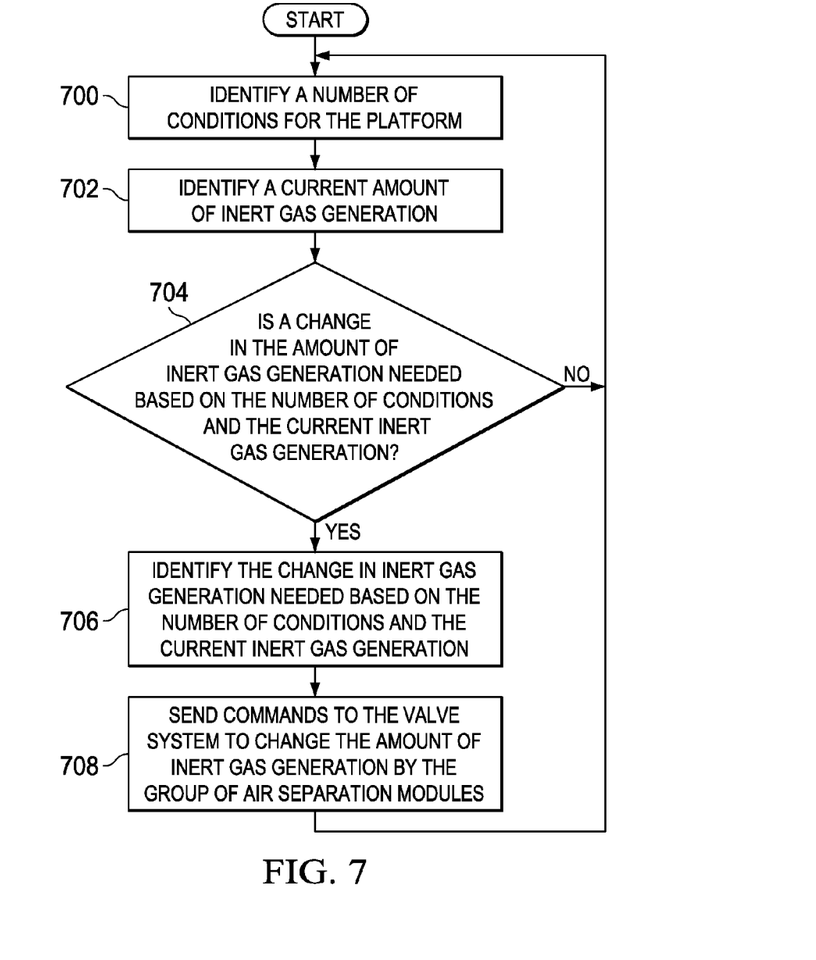
FIG. 7 is an illustration of a flowchart of a process for identifying a desired amount of inert gas generation in accordance with an illustrative embodiment.

Turning now to FIG. 7, an illustration of a flowchart of a process for identifying a desired amount of inert gas generation is depicted in accordance with an illustrative embodiment. The process illustrated in FIG. 7 is an example of operations that may be used to implement operation 600 in FIG. 6. In particular, this process may be implemented in controller 240 in FIG. 2.

The process begins by identifying a number of conditions for the platform (operation 700). The number of conditions is one or more conditions of the platform that may affect the amount of inert gas that is needed for the fuel tank system. This amount of inert gas may be some amount that is desired to provide a level of inertness for the fuel tank system.

The number of conditions may include at least one of a climb rate, a descent rate, a fuel quantity in the fuel tank, an engine thrust setting, whether anti-icing systems are on or off, a pressure in the fuel tank system, an amount of fuel vapor in the fuel tank system, an amount of oxygen in the fuel tank system, and other suitable conditions. These conditions also may include a temperature of the group of air separation modules. The flow of air into the group of air separation modules may be at a higher level even though a lower flow of air will generate a desired amount of inert gas. This higher flow may be needed to maintain a desired temperature for the group of air separation modules to operate as desired. Further, an operator may be able to override an automatically selected operating state through sending a user input to the airflow control system through a user input to the flow control system.

The process then identifies a current amount of inert gas generation (operation 702). In these illustrative examples, the current amount of inert gas generation may be identified in a number of different ways. For example, the amount of inert gas generation may be identified from the flow of inert gas out of the group of air separation modules into the fuel tanks. In other illustrative examples, the current amount of inert gas generation may be identified from the commanded state of the distribution system components.

When the amount of inert gas flowing from the group of air separation modules is known, the amount of air consumed by the group of air separation modules can be calculated, estimated, or otherwise identified.

The flow of air into the group of air separation modules and the flow of inert gas out of the group of air separation modules may be identified using a sensor. This sensor may be, for example, a flow sensor, an air flow meter, and other suitable types of sensors.

A determination is made as to whether a change in the amount of inert gas generation is needed based on the number of conditions and the current inert gas generation (operation 704). If a change in the amount of inert gas generation is not needed, the process returns to operation 700.

Otherwise, the process identifies the change in inert gas generation needed based on the number of conditions and the current inert gas generation (operation 706). In operation 706, the change is based on the amount of inert gas generation needed to provide a desired level of inertness. In these illustrative examples, the change may be made to provide a desired level of inertness while having as low of a flow of inert gas and as low of a flow of inlet air as possible.

The process then sends commands to the valve system to change the amount of inert gas generation by the group of air separation modules (operation 708), with the process then returning to operation 700.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, one or more of the illustrative embodiments may be implemented to reduce air needed from a source for inert gas generation in a manner that increases fuel efficiency in a platform. Further, one or more of the illustrative embodiments also may reduce maintenance that may be needed for a group of air separation modules in an inert gas generation system by reducing the pressure of air flowing into the group of air separation modules when a lower pressure can be used to provide a desired inert gas generation.

Figure 8:
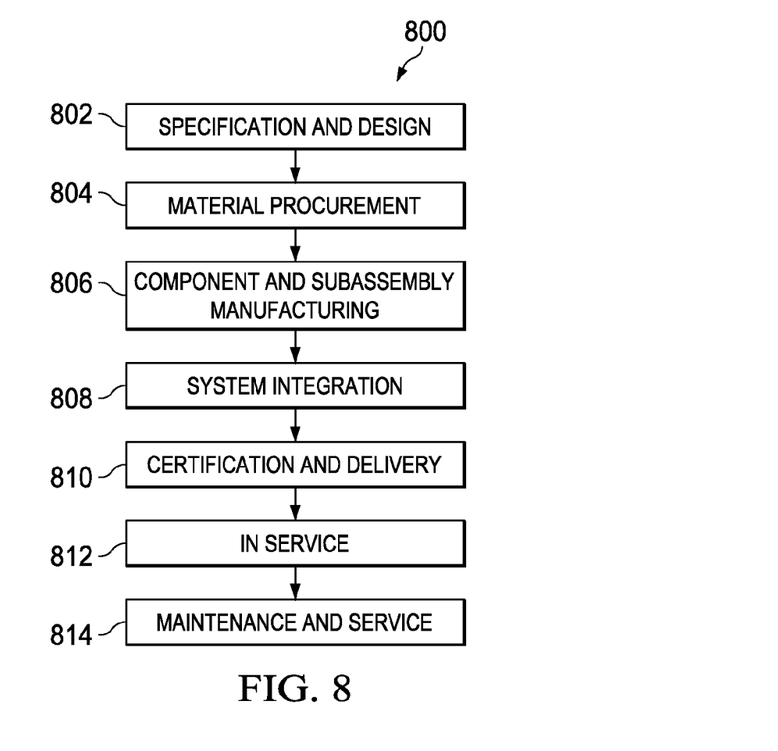
FIG. 8 is an illustration of an aircraft manufacturing and service method in accordance with an illustrative embodiment.
Figure 9:
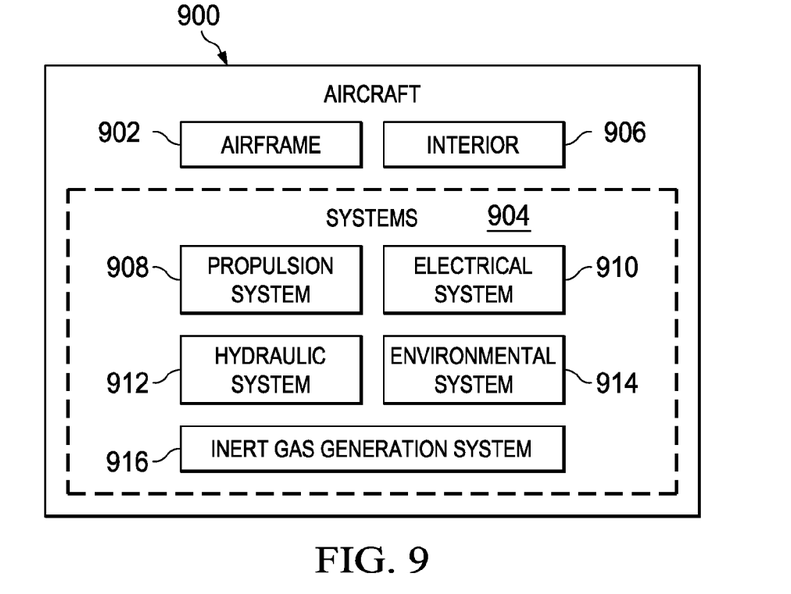
FIG. 9 is an illustration of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, environmental system 914, and inert gas generation system 916. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8. In one illustrative example, components or subassemblies produced in component and subassembly manufacturing 806 in FIG. 8 may be fabricated or manufactured in a manner similar to components or subassemblies produced while aircraft 900 is in service 812 in FIG. 8. For example, an air flow control system may be manufactured for inert gas generation system 916 in accordance with an illustrative embodiment to include an air flow control system.

As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812 and/or during maintenance and service 814 in FIG. 8.

Inert gas generation systems manufactured in accordance with an illustrative embodiment may be added to aircraft 900 or modifications may be made to inert gas generation system 916 already present in aircraft 900 while aircraft 900 is in service 812 or in maintenance and service 814. Further, an air flow control system in accordance with an illustrative embodiment may be used as part of an upgrade or refurbishment of aircraft 900 when inert gas generation system 916 is added to aircraft 900.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an air separation module configured to separate an inert gas from bleed air input into the air separation module; and
   an air flow control system comprising a plurality of valves, a first one of the plurality of valves located upstream from the air separation module and configured to control a flow of the bleed air into the air separation module to reduce bleed air use by a platform in which the air separation module is located when a need for the inert gas is reduced and a desired operating temperature is maintained for the air separation module, and a second one of the plurality of valves located downstream from the air separation module and configured to control an amount of nitrogen relative to oxygen in the inert gas exiting the air separation module.

2. The apparatus of claim 1, wherein the air flow control system is further configured to control a pressure in the flow of the air input into the air separation module.

3. The apparatus of claim 1, wherein the air flow control system is configured to control the flow of the air into the air separation module such that fuel use by a platform in which the air separation module is located is reduced.

4. The apparatus of claim 1, wherein the air flow control system further comprises:
   a controller configured to control operation of the valve.

5. The apparatus of claim 4, wherein the controller comprises:
a computer system in an aircraft.

6. The apparatus of claim 1 further comprising:
an air source configured to supply the air.

7. The apparatus of claim 6, wherein the air source is an aircraft engine.

8. The apparatus of claim 7, wherein a reduction in the flow of the air into the air separation module increases a fuel efficiency of the aircraft engine.

9. The apparatus of claim 1, wherein the inert gas is selected from one of nitrogen, nitrogen enriched air, and carbon dioxide.

10. The apparatus of claim 1 further comprising:
a distribution system connected to an output of the air separation module, wherein the distribution system is configured to send the inert gas to a fuel tank.

11. The apparatus of claim 1, wherein the air separation module and the air flow control system are located in an aircraft and wherein the air flow control system is configured to reduce the flow of the air during a phase of flight in which a lower flow of the inert gas into a fuel tank of the aircraft is needed to reduce combustibility of vapors in the fuel tank.

12. The apparatus of claim 1, wherein the air separation module and the air flow control system are located in a platform selected from one of a mobile platform, a stationary platform, a land-based structure, an aquatic-based structure, a space-based structure, an aircraft, a submarine, a bus, a personnel carrier, a tank, a train, an automobile, a spacecraft, a space station, a satellite, a surface ship, a power plant, a manufacturing facility, and a building.

13. A method for controlling a flow of bleed air into an air separation module, the method comprising:
identifying a desired amount of inert gas generation for a fuel tank system;
controlling the flow of the bleed air into the air separation module based on the desired amount of inert gas generation for the fuel tank system; and
controlling a flow of inert gas exiting the air separation module based on a desired amount of nitrogen relative to oxygen in the inert gas.

14. The method of claim 13 further comprising:
receiving the air from an engine.

15. The method of claim 13, wherein the air separation module and the fuel tank system are located in an aircraft and wherein the desired amount of inert gas generation for the fuel tank system is based on at least one of a climb rate, a descent rate, a fuel quantity in the fuel tank system, an engine thrust setting, whether anti-icing systems are on or off, a pressure in the fuel tank system, an amount of fuel vapor in the fuel tank system, a temperature of the air separation module, and an amount of oxygen in the fuel tank system.

16. The method of claim 13, wherein a second flow of the air into the air separation module is controlled by an air flow control system.

17. The method of claim 16, wherein the air flow control system comprises:
a valve; and
a controller configured to control the valve.

18. The method of claim 13, wherein an inert gas is selected from one of nitrogen, nitrogen enriched air, and carbon dioxide.

* * * * *